No. 752,972.

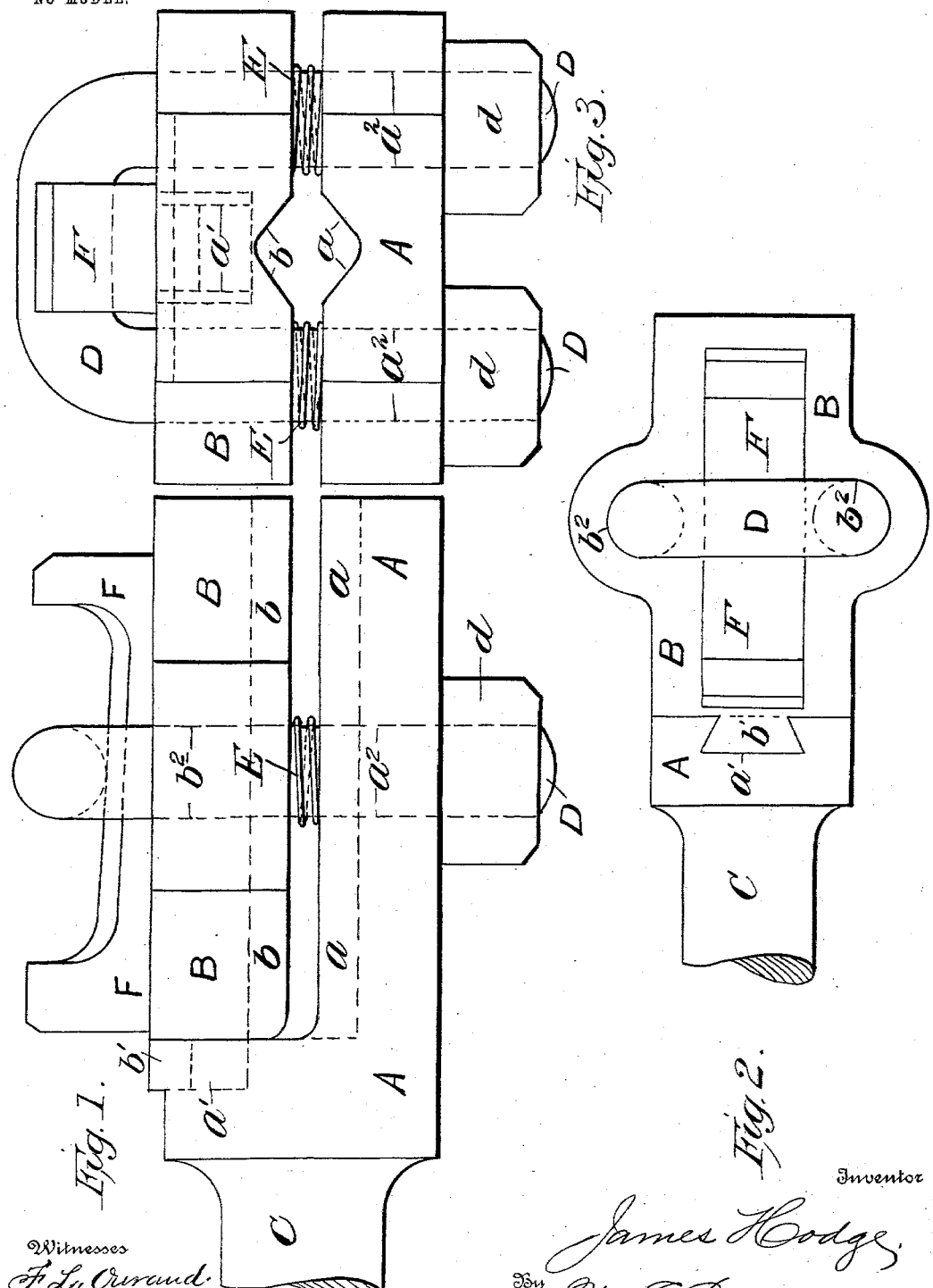

Patented February 23, 1904.

UNITED STATES PATENT OFFICE.

JAMES HODGE, OF WITWATERSRAND GOLD FIELDS, TRANSVAAL.

CHUCK FOR ROCK-DRILLING MACHINES.

SPECIFICATION forming part of Letters Patent No. 752,972, dated February 23, 1904.

Application filed December 21, 1903. Serial No. 186,084. (No model.)

*To all whom it may concern:*

Be it known that I, JAMES HODGE, a subject of the King of England, residing on the property of the Wemmer Gold Mining Company, Limited, Witwatersrand Gold Fields, Transvaal, have invented certain new and useful Improvements in the Chucks of Rock-Drilling Machines, (for which I have made application for patent in the Transvaal, No. 418, filed October 9, 1903,) of which the following is a specification.

This invention relates to the chucks of rock-drills or rock-drilling machines, and has for its object to provide an efficient chuck of simple and inexpensive construction.

By the present invention I obviate the necessity for the use of bushings for the chuck. The drills do not require to be shanked, and they cannot stick fast in the chuck. The drills can be changed with greater rapidity than is possible with the present forms of chuck, and a better grip of the drill is obtained. The excessive wear and tear of the U-bolts is obviated, and the repeated renewal of same is avoided, while the cost of repairs is reduced to a minimum.

The invention consists in constructing the head or body of the chuck in two parts between which the drill is secured and in constructing one part with a dovetail or similar recess and the other part with a corresponding dovetail or similar projection fitting the recess.

It consists, further, in forming holes in the two parts to receive a U-bolt, between which bolt and the head a wedge or taper key is placed in such manner that when it is moved in one direction the drill-shank is gripped between the two parts of the head and the drill thereby secured in position and when moved in the opposite direction the drill is released, and in providing springs between the two parts which operate to expand the same to release the drill.

The invention will now be fully described by aid of the accompanying drawings, wherein—

Figure 1 shows a longitudinal or side elevation of the same; Fig. 2, a plan, and Fig. 3, an end elevation.

The head or body of the chuck is made in two parts A B. The part A is preferably formed in one piece with and on the outer extremity of the piston-rod C of the rock-drilling machine. This part A, which for convenience I will designate the "lower part," is provided with a longitudinal V or other groove $a$, in which the shank of the drill fits. The other and detachable part B of the head, which for convenience I will designate the "cap," is arranged immediately above the lower part A, and it is also grooved on the under side, as seen at $b$, to accommodate the shank or extremity of the drill or bit. The grooves $a\ b$ in the parts A B form between them the longitudinal hole in which the shank or extremity of the drill or bit is projected and secured.

The inner end of the cap B is formed with a dovetail or other suitably-shaped projection $b'$, and the lower part A is constructed with a corresponding dovetail or other suitably-shaped recess $a'$, in which the projection $b'$ fits. Instead of forming the projection $b'$ on the cap B and the recess $a'$ in the lower part A the projection could be formed on the lower part and the recess be made in the cap, if preferred. The cap B is capable of moving up or down in the dovetail groove $b'$, so that the two parts A B of the head may be opened to receive the drill-shank and be closed to grip the shank in order to secure the drill.

The parts A B are formed at each side with a boss or enlargement through which are provided coincident holes $a^2\ b^2$, respectively. In the holes $a^2\ b^2$ in the parts A B is arranged the ordinary U-bolt D. The extremities of the bolt D beneath the lower part A are fitted with nuts $d$ in the usual manner.

Arranged round the U-bolt D at either side and between the parallel and plane faces of the two parts A B are small spiral springs E, which springs E operate to raise the cap B to facilitate the insertion of the drill.

Between the inside of the bolt D at the top and the top of the detachable cap B is arranged a taper key or wedge F, which when moved in one direction forces the cap B downward to grip the drill and when moved in the opposite direction releases the drill to permit of its being withdrawn and renewed, as may be desired. When the key or wedge F is moved to release the drill, the spiral springs E raise the cap B, which admits of the ready removal of the drill and the insertion of a new one.

Instead of arranging the wedge or key F above the cap B the U-bolt D may be inverted and the key or wedge F placed beneath the lower part A and the nuts be screwed on the extremities of the U-bolt above the cap B.

The working of the chuck is as follows: After the shank or extremity of the drill or bit has been projected between the parts A B to the bottom of the grooves $a\ b$ the key or wedge F is hammered so as to draw the U-bolt upward against the nuts $d$. This forces the cap B downward, and the drill is thereby secured between the parts A B. When the wedge or key F is hammered in the opposite direction, the springs raise the cap B and so allow the drill or bit to be withdrawn.

What I claim as my invention, and desire to protect by Letters Patent, is—

1. In a rock-drill chuck a head or body constructed in two parts longitudinally, the one part being provided with a projection and the other part with a corresponding groove or recess to receive said projection, in such manner that the two parts of the head may be expanded to receive the shank of the drill, and means for compressing the two parts of the head to secure the drill, substantially as described.

2. In a rock-drill chuck, a head or body constructed in two parts longitudinally, the one part being constructed with a projection and the other part with a corresponding groove or recess to receive said projection, the two parts being adapted to receive between them and grip the shank of the drill, a spring medium interposed between the plane parallel faces of the two parts of the head for expanding the two parts of the head to receive or release the drill, and means for forcing the two parts together to grip and secure the shank of the drill or bit, substantially as described.

3. In a chuck for rock-drills in combination a head or body constructed in two parts longitudinally, the one part being formed with a dovetail projection and the other part with a corresponding dovetail recess in which said projection fits in such manner that the two parts may be expanded to receive the drill and means for compressing the two parts of the head to secure the drill when it is projected between them, substantially as described.

4. In a chuck for rock-drills in combination a head or body constructed in two parts longitudinally, the one part being formed with a dovetail projection and the other part with a corresponding dovetail recess in which said projection fits, the two parts being adapted to receive between them and grip the shank of the drill, the springs interposed between the plane parallel faces of the two parts of the head to receive or release the drill, and means for forcing the two parts together to grip and secure the shank of the drill or bit, substantially as described.

5. In a chuck for rock-drills the combination of the head or body comprising a lower part and an upper and detachable part or cap, the one part formed with a projection fitting a correspondingly-shaped recess in the other part and adapted to receive and secure between them the drill or bit, a U-bolt projected through coincident holes formed in the two parts of the head at each side, nuts screwed on the extremities of the U-bolt beneath the one part and a taper key or wedge interposed between the top of the U-bolt and the bottom of the other part for forcing the detachable part or cap inward to grip the shank of the drill or bit, substantially as described.

6. In a chuck for rock-drills the combination of the head or body comprising a lower part and an upper and detachable part or cap, the one part formed with a projection fitting a corresponding recess in the other part and adapted to receive and secure between them the drill or bit, a U-bolt projected through coincident holes formed in the two parts of the head at each side, nuts screwed on the extremities of the U-bolt beneath the one part, and the taper key or wedge interposed between the top of the U-bolt and the bottom of the other part for forcing the detachable part or cap inward to grip the shank of the drill, springs encircling the U-bolt between the parallel faces of the two parts of the head for moving the detachable part to release the shank of the drill or bit, substantially as described.

7. In combination the part A of the head or body of the chuck constructed with the internal longitudinal groove $a$ to receive the extremity of the drill, and with the dovetail recess $a'$ at the inner end and the holes $a^2$ at each side of the groove $a$, the detachable part or cap B of the head or body of the chuck constructed with the internal longitudinal groove $b$ to receive the extremity of the drill and at the inner end with the dovetail projection $b'$ fitting the recess $a'$ in the part A and with the holes $b^2$ at each side of the groove $b$ coinciding with the holes $a^2$ in the part A, the U-bolt D projected through the coincident holes $a^2\ b^2$ at each side of the longitudinal grooves $a\ b$, the spiral springs E arranged around the U-bolt between the inner plane parallel faces of the parts A B at each side of the grooves $a\ b$, the nuts $d$ screwed on the ends of the U-bolt beneath the one part of the head and the taper key or wedge F arranged between the U-bolt and the other part of the head for forcing the cap inward to grip the shank of the drill in the grooves $a\ b$, substantially as described.

In witness whereof I have hereunto set my hand in the presence of two subscribing witnesses.

JAMES HODGE.

Witnesses:
   CHAS. OVENDALE,
   R. OVENDALE.